F. W. CARPENTER.
THRESHING MACHINE ATTACHMENT.
APPLICATION FILED MAY 13, 1910.
1,055,386.
Patented Mar. 11, 1913.
5 SHEETS—SHEET 3.
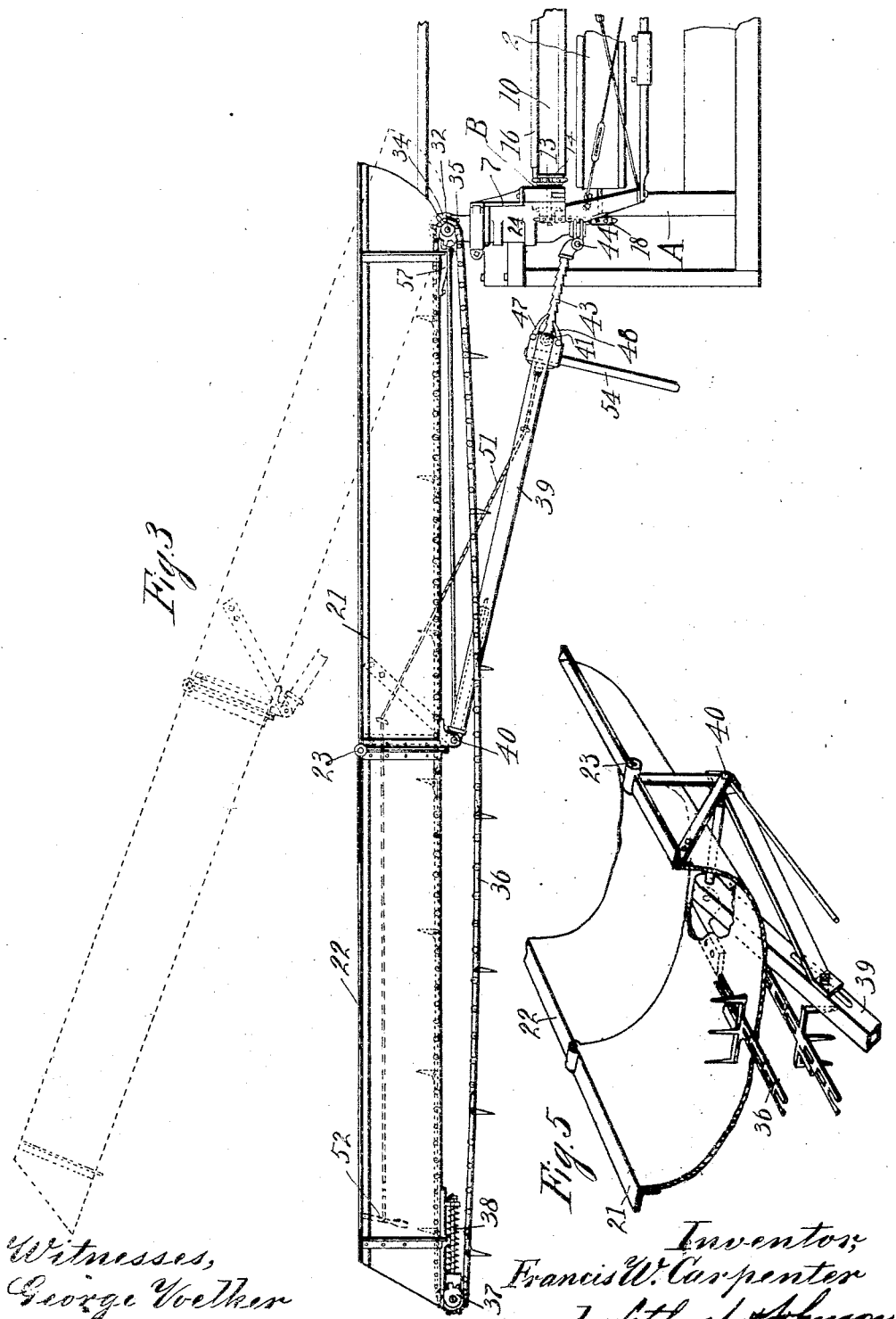
Witnesses,
George Voelker
J. Smith
Inventor,
Francis W. Carpenter
by Lothrop Johnson
His Attorneys

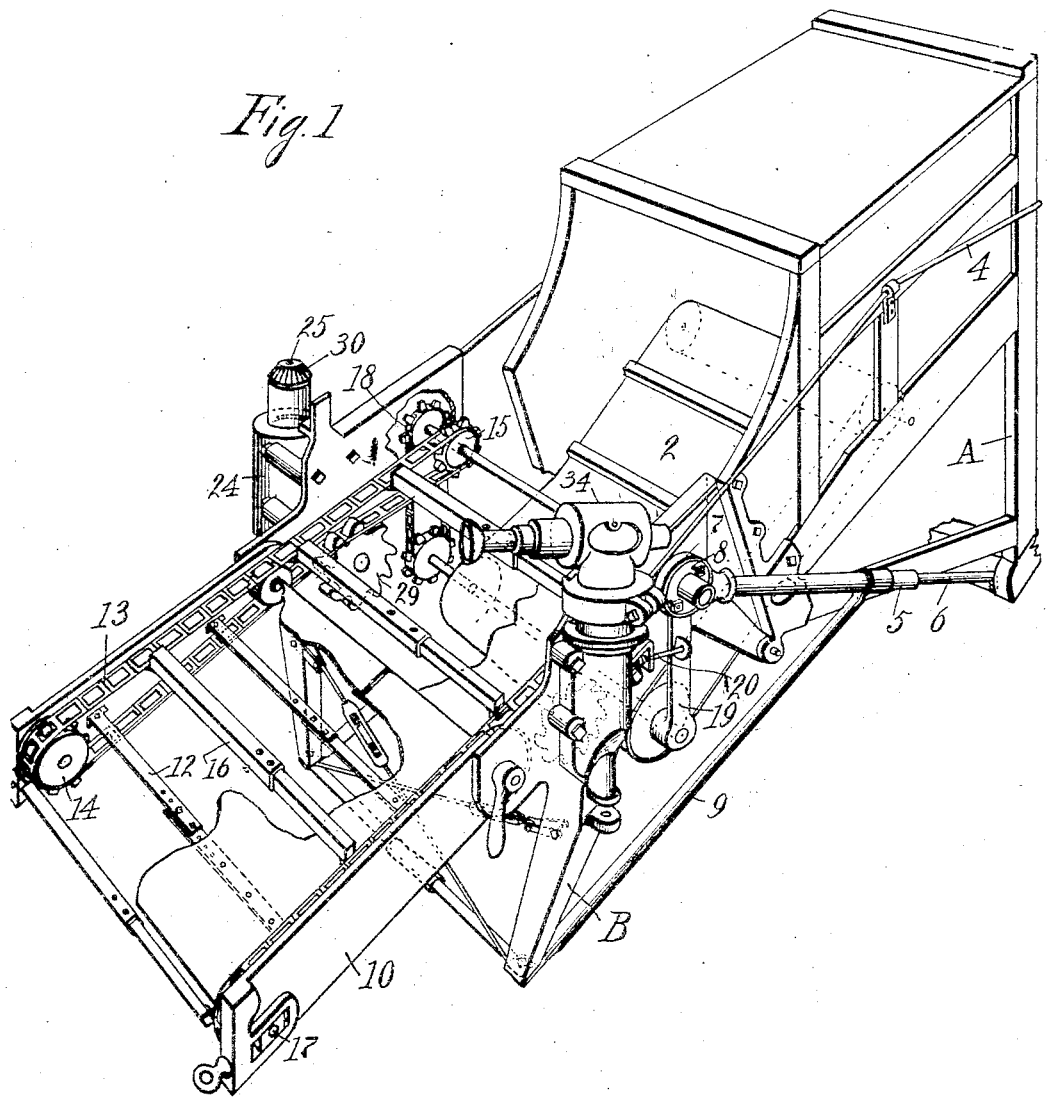

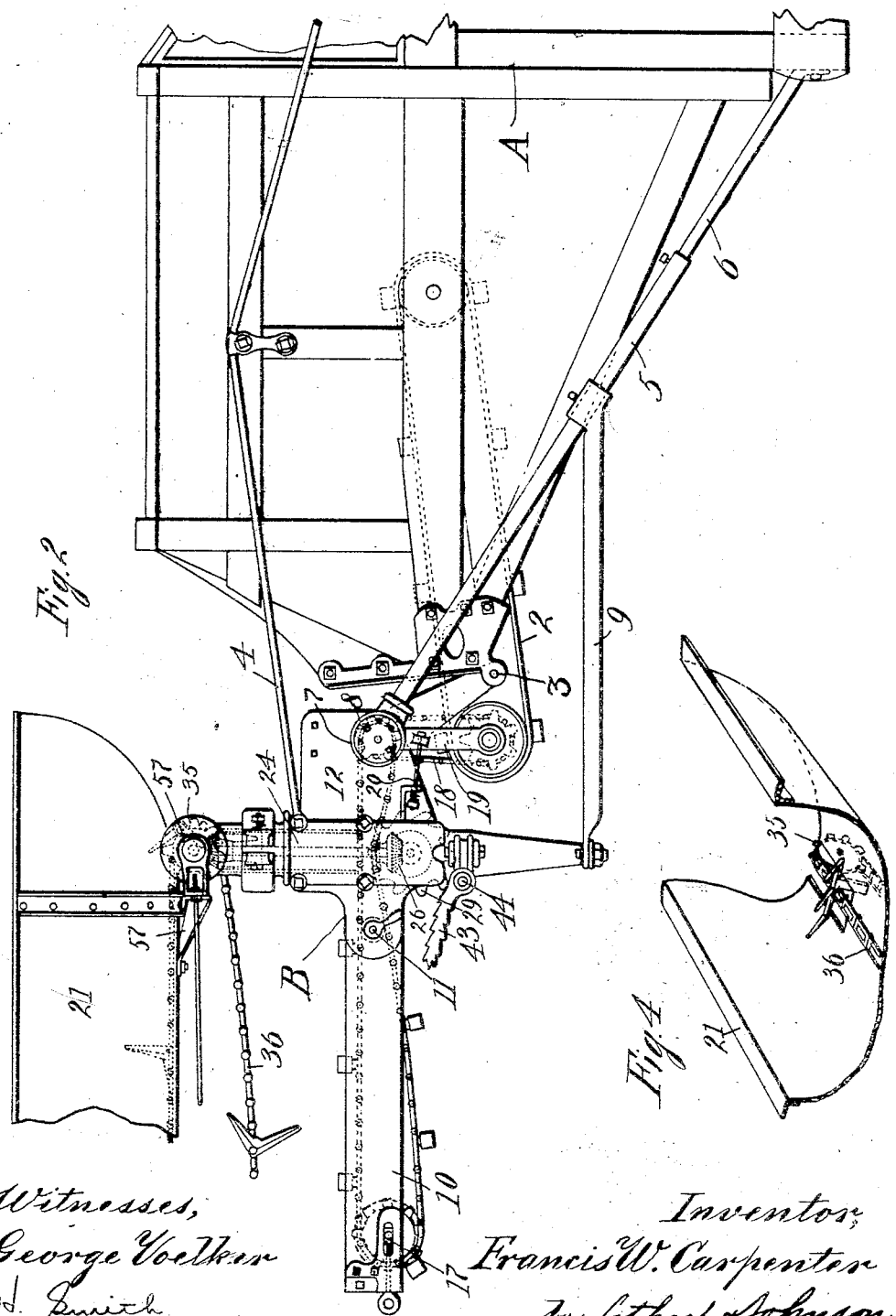

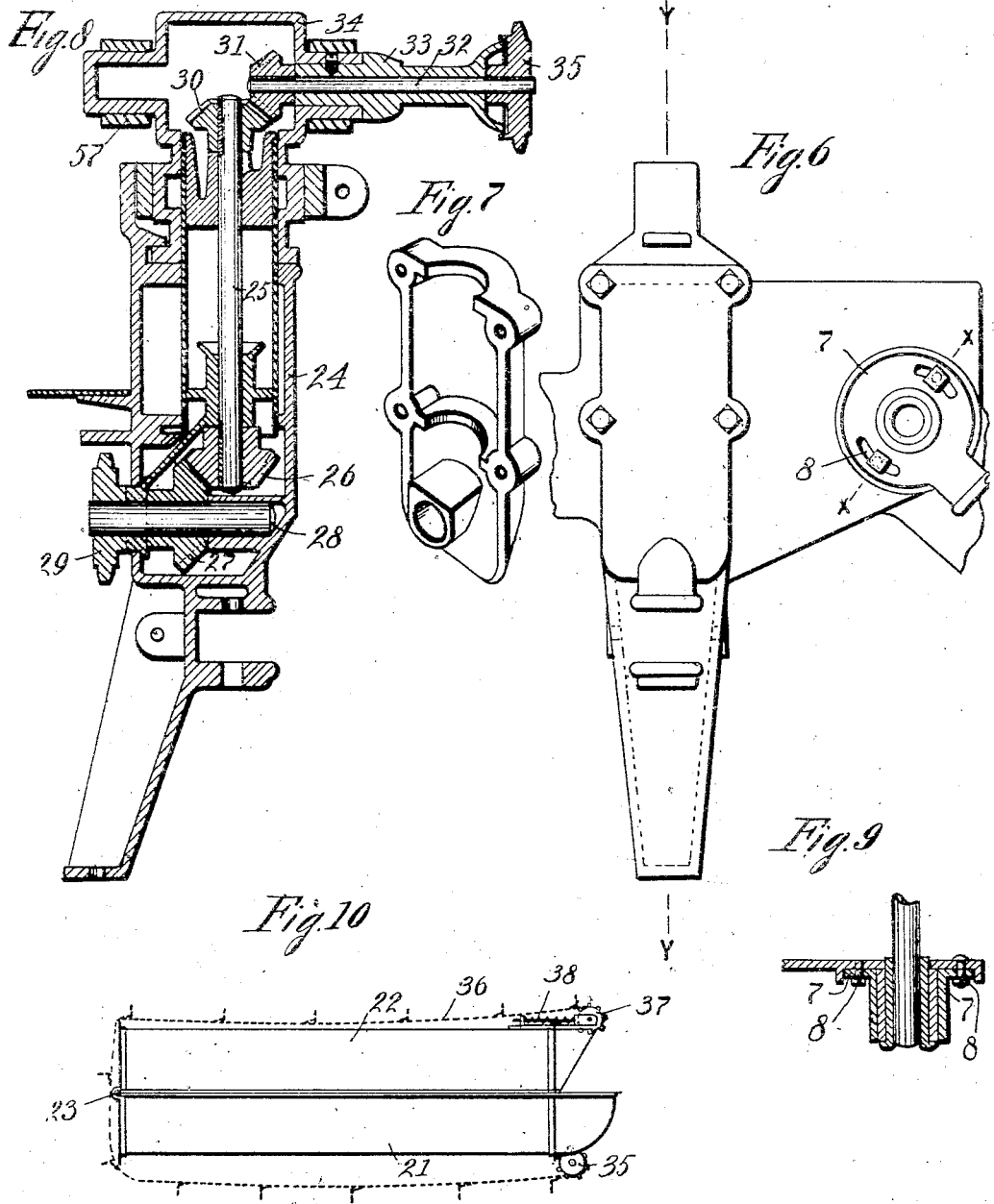

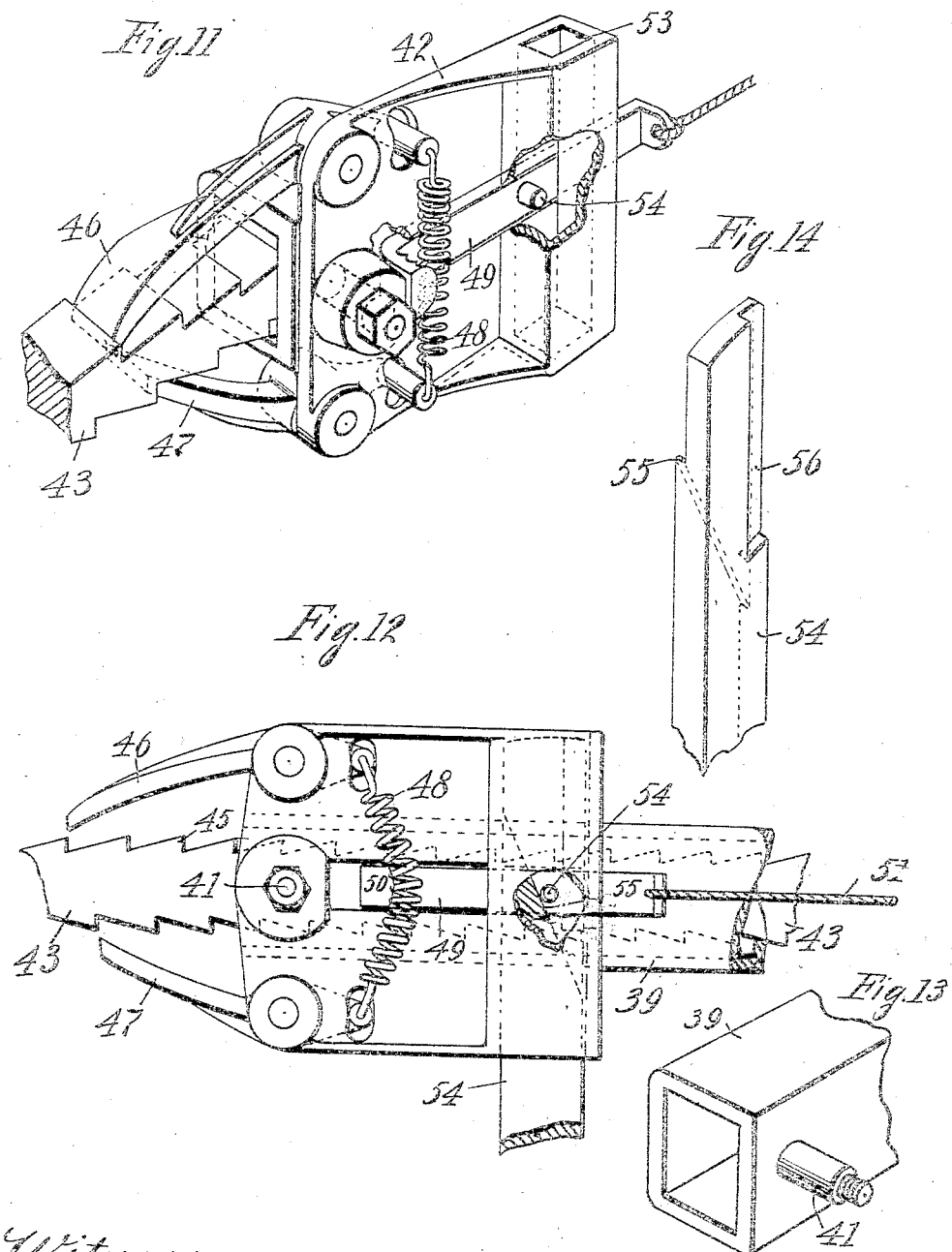

BEST AVAILABLE COPY

UNITED STATES PATENT OFFICE.

FRANCIS W. CARPENTER, OF ST. PAUL, MINNESOTA, ASSIGNOR TO CARPENTER WING CARRIER MANUFACTURING COMPANY, OF ST. PAUL, MINNESOTA, A CORPORATION OF MINNESOTA.

THRESHING-MACHINE ATTACHMENT.

1,055,386.                    Specification of Letters Patent.       Patented Mar. 11, 1913.

Application filed May 13, 1910. Serial No. 561,229.

*To all whom it may concern:*

Be it known that I, FRANCIS W. CARPENTER, a citizen of the United States, residing at St. Paul, in the county of Ramsey and State of Minnesota, have invented certain new and useful Improvements in Threshing-Machine Attachments, of which the following is a specification.

My invention relates to improvements in feeder attachments for threshing machines wherein laterally extending adjustable conveyer troughs are supported in connection with a thresher feeder, its object being particularly to provide an improved form of detachable attachment which may also be adjusted to fit different types of feeder.

To this end my invention consists in the features of construction, combination and arrangement of parts hereinafter described and claimed.

In the accompanying drawings forming part of this specification, Figure 1 is a perspective view of my attachment shown applied to the feeder of a thresher machine; Fig. 2 is a side elevation of the same; Fig. 3 is a side elevation showing the troughs and connected parts; Figs. 4 and 5 are perspective detail views of portions of one of the troughs; Figs. 6 and 7 are detail views of a supporting casting for the troughs; Fig. 8 is a section on line $y$—$y$ of Fig. 6; Fig. 9 is a section on line $x$—$x$ of Fig. 6; Fig. 10 is a side elevation of one of the troughs folded; Figs. 11, 12 and 13 are detail views of a portion of an adjustable supporting mechanism for the free ends of the troughs; and Fig. 14 is a partial detail view of a coöperating actuating lever for said adjusting mechanism.

Referring to the drawings A represents the framework of an ordinary threshing machine, and 2 the feeder.

B represents my improved attachment preferably detachably supported upon the threshing machine frame in the following described manner: The lower inner end of the attachment frame has pivotal support 3 upon brackets carried by the thresher frame. The upper end of the attachment frame is connected by brace rods 4 with the sides of the machine. The attachment frame is further connected with the machine by the adjustably connected rods 5 and 6, the rods 6 being secured to the machine and the rods 5 being supported in heads 7, which heads are turnable upon the attachment frame through the medium of the circumferential slot and pin connection 8 see Fig. 6. Bars 9 further connect the underside of the attachment frame with the rod 5. The attachment frame embodies a carrier frame 10 having pivotal support 11 upon the fixed portion 12. The fixed portion of the frame as well as the hinged portion 10 are adjustable in width through the medium of the adjustably connected bars 12 connecting the side walls. Endless carrier chains 13 pass over sprockets 14 and 15 supported by the pivoted and fixed portions of the attachment frames respectively, said chains being connected by extensible cross bars 16. Suitable adjustment means 17 may be provided for the sprocket bearings. The inner end of the endless carrier has chain and sprocket driving connection 18 with the outer end of the feeder 2. The outer end of the feeder 2 is supported from the head 7 by an arm 19, the arm 19 having slidable spring support 20 from the adjacent portion of the attachment frame.

Supported upon opposite sides of the feeder section are my improved conveyer troughs, each consisting preferably of trough sections 21 and 22 having hinge connection 23. Each conveyer trough is supported at its inner end upon the feeder section in the following described manner: Journaled within a boxing 24 at each side of the feeder section is a vertical shaft 25, the shaft 25 having beveled pinion connection 26 and 27 at its lower end with a horizontal shaft 28. The inner end of the horizontal shaft 28 carries a sprocket 29 with which intermeshes the adjacent chain 13. The upper end of the vertical shaft 25 is connected by the beveled pinions 30 and 31 with the horizontal shaft 32 journaled in the arm 33. The arm 33 is carried by a head 34 which is rotatable upon the boxing 24 as indicated in Fig. 8. The inner end of the conveyer has swing support 57 upon the head 34, the outer end of the shaft 32 carrying a sprocket 35 intermeshing with an endless conveyer chain 36 extending lengthwise of the trough and passing at the outer end of the trough over a sprocket 37. The sprocket 37 has a sliding spring support 38 to compensate for the tension upon the conveyer chain when the trough is folded as shown in Fig. 10.

In order to vertically swing each conveyer trough upon its pivotal support I provide the adjusting mechanism shown specifically in Figs. 11 and 12, similar mechanism being provided for each trough. Said mechanism comprises a rectangular tube 39 having pivotal connection 40 at its outer end to the underside of the trough section 21, the inner end of said tube pivotally supporting, as by means of a pin 41, the casing 42, which casing forms a support for the actuating mechanism. A coöperating bar 43 has pivotal support 44 at one end upon the framework of the attachment and at its other end extends into the tube 39. The bar 43 is formed upon its opposite sides with alternating forwardly extending teeth 45. Pivotally supported upon the casing 42 are the forwardly extending dogs 46 and 47, the dog 46 extending forwardly of the dog 47 and said dogs being in position to engage with the teeth upon opposite sides of said bar. The inner ends of said dogs are connected by a coil spring 48. Longitudinally slidable within said casing is a bar 49, its inner end 50 being hooked over the spring 48 and its outer end being connected with a cable 51 extending to a hand lever 52 fulcrumed upon the conveyer trough. The bar 49 extends through a vertical opening 53 formed in the casing, said bar being formed with a lateral pin 54 standing within said opening. The opening 53 is shaped to receive the hand tool 54. The hand tool 54 is formed upon its side at one end with a beveled portion 55 so that when the tool is inserted into the opening 53 to bring the beveled portion behind the pin 54 it will draw the bar 49 rearwardly and with it the spring 48 to release the dogs 46 and 47 as shown in Fig. 12. Upon the opposite side the bar is formed with a groove 56 which, when the bar is turned around and inserted into the opening 53, will receive the pin 54 without affecting the position of the same and allowing the parts to remain in the position shown in Fig. 9.

In the position shown in Fig. 11 the spring 48 exerts pressure to hold the dogs 46 and 47 in locking engagement. When the spring is pulled rearwardly to release the dogs 46 and 47 as shown in Fig. 12 the bar 43 will telescope within the tube 39. The hook 50 is corrugated as shown to permit a grip for the spring and prevent relative sliding of either end thereof.

The adjusting mechanism shown specifically in Figs. 11 to 14, inclusive being included in a separate application, is not specifically claimed herein.

I claim as my invention:

1. The combination with a threshing machine and its feeder, of an independent feeder section removably supported in connection with and forming an extension of said feeder, said extension being adjustable in width to fit different widths of feeder and conveyer troughs supported on opposite sides of said extension and swingable in horizontal planes.

2. The combination with a threshing machine and its feeder, of an independent feeder section removably supported in connection with and forming an extension of said feeder, said extension being adjustable in width to fit different widths of feeder and conveyer troughs supported on opposite sides of said extension and swingable in horizontal and vertical planes.

3. The combination with a threshing machine having a feeder, of an independent feeder section removably supported in connection with and forming an extension of said feeder, said feeder section comprising side bars and an extensible connection for said side bars whereby said section may be adjusted to fit different widths of feeder, and conveyer troughs supported upon opposite sides of said extension.

4. The combination with a threshing machine having a feeder, of an independent feeder section removably supported in connection with and forming an extension of said feeder, said extension comprising a relatively fixed portion and an extension hinged portion, both said fixed portion and extension hinged portion being adjustable to fit different widths of feeder, and conveyer troughs supported upon opposite sides of said relatively fixed portion.

5. The combination with a threshing machine having a feeder, of an independent feeder section comprising a main portion removably supported in connection with and forming an extension of said feeder, an extension portion having hinge support upon said removably supported portion, and conveyer troughs supported upon opposite sides of the main portion of said section.

6. The combination with a threshing machine having a feeder, of an independent feeder section comprising a main portion removably supported in connection with and forming an extension of said feeder, an extension portion having hinge support upon said removably supported portion, both said main and extension hinged portions being adjustable to different widths of feeders, and conveyer troughs supported upon opposite sides of the main portion of said section.

7. The combination with a threshing machine having a feeder, of an independent feeder section comprising a main portion removably supported in connection with and forming an extension of said feeder, an extension portion having hinge support upon said removably supported portion, and rods adjustably connecting the main portion of said independent feeder section with the framework of the machine.

In testimony whereof I affix my signature in presence of two witnesses.

FRANCIS W. CARPENTER.

Witnesses:
H. S. JOHNSON,
H. SMITH.

Copies of this patent may be obtained for five cents each, by addressing the "Commissioner of Patents, Washington, D. C."